(12) United States Patent
Yamada et al.

(10) Patent No.: US 8,830,518 B2
(45) Date of Patent: Sep. 9, 2014

(54) IMAGE DATA MANAGEMENT APPARATUS, IMAGE FORMING APPARATUS AND IMAGE FORMING SYSTEM

(75) Inventors: Hirokazu Yamada, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1340 days.

(21) Appl. No.: 11/872,747

(22) Filed: Oct. 16, 2007

(65) Prior Publication Data

US 2008/0165372 A1 Jul. 10, 2008

(30) Foreign Application Priority Data

Nov. 10, 2006 (JP) .................................. 2006-304632

(51) Int. Cl.
| | |
|---|---|
| G06K 15/22 | (2006.01) |
| G06F 3/12 | (2006.01) |
| H04N 1/327 | (2006.01) |
| H04N 1/32 | (2006.01) |
| H04N 1/44 | (2006.01) |
| B41J 3/44 | (2006.01) |
| B41J 3/46 | (2006.01) |
| H04N 1/00 | (2006.01) |

(52) U.S. Cl.
CPC ............... *B41J 3/46* (2013.01); *H04N 1/32776* (2013.01); *H04N 2201/0039* (2013.01); *G06F 3/1211* (2013.01); *H04N 1/324* (2013.01); *H04N 1/4406* (2013.01); *H04N 1/4426* (2013.01); *G06F 3/1261* (2013.01); *B41J 3/44* (2013.01); *H04N 1/32771* (2013.01); *G06F 3/1204* (2013.01); *H04N 1/00244* (2013.01)
USPC .......................................... 358/1.4; 358/1.15

(58) Field of Classification Search
None
See application file for complete search history.

(56) References Cited

U.S. PATENT DOCUMENTS

| | | | | |
|---|---|---|---|---|
| 7,262,872 | B2 * | 8/2007 | Nakamura | .................... 358/1.14 |
| 2006/0244995 | A1 * | 11/2006 | Kushida | ...................... 358/1.15 |

FOREIGN PATENT DOCUMENTS

| | | |
|---|---|---|
| JP | 2002-132476 A | 5/2002 |
| JP | 2002-175241 A | 6/2002 |
| JP | 2004-220140 | 8/2004 |
| JP | 2004-241811 | 8/2004 |
| JP | 2004-280461 | 10/2004 |
| JP | 2005-143133 | 6/2005 |
| JP | 2006-087021 | 3/2006 |

OTHER PUBLICATIONS

Japanese Office Action issued in corresponding Japanese Patent Application No. 2006-304632, dated Jul. 21, 2009, and English translation thereof.
Notification of Reasons for Refusal in JP 2006-304632 dated Aug. 19, 2008, with English Translation thereof.
Notification of Reasons for Refusal in JP 2006-304632 dated Apr. 14, 2009, and an English Translation thereof.

* cited by examiner

*Primary Examiner* — Marcus T Riley
(74) *Attorney, Agent, or Firm* — Buchanan Ingersoll & Rooney PC

(57) ABSTRACT

An image data management apparatus which provides a pull-print mark for a file which is expected to be printed at an externally connected image forming apparatus, that is, to be subjected to pull-printing. It is possible to provide the pull-print mark for a plural number of files. When a user commands pull-printing of such a file at an externally connected image forming apparatus, a search is made within the files provided with the pull-print mark. Thereby, the load on the image data management apparatus for searching the file is light. In order to permit a user to command pull-printing at a printer with a simple user interface, simple authentication codes may be used.

13 Claims, 15 Drawing Sheets

FIG. 5a

REGISTRATION INFORMATION IN MFP 100

| NO. | USER ID | PRIVATE INFORMATION ||||| 
|---|---|---|---|---|---|---|
| 1 | DAVID | PRIVACY A | ADDRESS NOTE A | PANEL SETTINGS A | AUTHENTICATION A | HISTORY A |

FIG. 5b

REGISTRATION INFORMATION IN MFP 101

| NO. | USER ID | PRIVATE INFORMATION |||||
|---|---|---|---|---|---|---|
| 2 | JULIE | PRIVACY B | ADDRESS NOTE B | PANEL SETTINGS B | AUTHENTICATION B | HISTORY B |

FIG. 5c

REGISTRATION INFORMATION IN MFP 102

| NO. | USER ID | PRIVATE INFORMATION |||||
|---|---|---|---|---|---|---|
| 3 | MICHAEL | PRIVACY C | ADDRESS NOTE C | PANEL SETTINGS C | AUTHENTICATION C | HISTORY C |
| 4 | SUSAN | PRIVACY D | ADDRESS NOTE D | PANEL SETTINGS D | AUTHENTICATION D | HISTORY D |

FIG. 6

| NO. | USER ID | PRIVATE INFORMATION | HOME MFP |
|---|---|---|---|
| 1 | DAVID | PRIVATE INFORMATION ON DAVID | IP ADDRESS OF MFP 100 |
| 2 | JULIE | PRIVATE INFORMATION ON JULIE | IP ADDRESS OF MFP 101 |
| 3 | MICHAEL | PRIVATE INFORMATION ON MICHAEL | IP ADDRESS OF MFP 102 |
| 4 | SUSAN | PRIVATE INFORMATION ON SUSAN | IP ADDRESS OF MFP 102 |

F I G. 7

```
ATTRIBUTE INFORMATION OF FILE

File Name: address.pdf
Storage Section: MFP100/DAVID
Storing Date: 2006/07/31
Pull-Print Mark: ON
Pull-Print User ID: DAVID
Pull-Print Simple Authentication: ON
Simple Authentication No. : 114672
```

FIG. 8

INPUT OF FILE ATTRIBUTE INFORMATION

FILE NAME: address.pdf  BOX: DAVID

PULL-PRINT: YES  PULL-PRINT USER ID: DAVID

SIMPLE AUTHENTICATION: YES  SIMPLE AUTHENTICATION NO.: 114672

ENTER — 121

CANCEL — 122

FIG. 13

PULL-PRINT FILE LIST: DAVID

| FILE NAME | STORING DATE | BOX |
|---|---|---|
| address.pdf | 2006/07/31 | HOME MFP, USER'S BOX |
| map.pdf | 2006/08/05 | HOME MFP, PUBLIC BOX |

CANCEL — 122

PRINT — 125

12

IMAGE DATA MANAGEMENT APPARATUS, IMAGE FORMING APPARATUS AND IMAGE FORMING SYSTEM

This application is based on Japanese application No. 2006-304632 filed on Nov. 10, 2006, the content of which is incorporated herewith by reference.

BACKGROUND OF THE INVENTION

1. Field of the Invention

The present invention relates to an image data management apparatus, an image forming apparatus and an image forming system.

2. Description of Related Art

JP2002-175241A discloses a printed material serving system. In the system, a host computer and a text file server manage text files and receive reservations for printing of the text files from users, and in response to a command from a store to output a printed material of a reserved file, the text file server sends data of the file to a printer installed in the store.

In a system wherein a server centrally manages data (for example, text data of documents) and sends the data in response to a command from a printer, the server manages other data besides the data to be requested by exterior printers. Then, the system has a problem that when the server searches for data in response to a command from a printer, the larger the volume of data stored in the server is, the heavier the load for the search is.

SUMMARY OF THE INVENTION

The present invention has been made in order to solve the problem. An object of the present invention is to provide an image data management apparatus, an image forming apparatus and an image forming system which can search for data to be printed out by an externally connected image forming apparatus with a light load.

In order to attain the object, a first aspect of the present invention provides an image data management apparatus which comprises an image data storage section and a connecting section to an image forming apparatus. The image data management apparatus further comprises: a marking section for, when image data which are expected to be printed at said image forming apparatus connected via the connecting section are stored in the data storage section, marking the image data with a designating mark; a designating information providing section for providing designating information for the marked image data, a user presenting the designating information to the image data management apparatus when the user makes a request for the marked image data at the image forming apparatus; a searching section for searching the data storage section for image data marked with the designating mark and provided with the designating information; and a search result sending section for sending a result of the search made by the searching section to the image forming apparatus.

A second aspect of the present invention provides an image forming apparatus connected to the image data management apparatus according to the first aspect of the present invention, and the image data storage apparatus and the image forming apparatus form a virtual sub-network. The image forming apparatus comprises a search result receiving section for receiving the result of the search from the image data management apparatus; and a notifying section for, when there are image data marked with the designating mark and provided with the designating information in the image data management apparatus, notifying the user of the existence of the image data.

The image forming apparatus may further comprise a display section; an operation section for receiving inputs from a user; and a designated data display section for, when the operation section receives an input from a user in response to the notification made by the notifying section, commanding the display section to display the result of the search.

The image forming apparatus may further comprise: a selecting section for selecting a piece of data to be printed from the result of the search; and a data requesting section for making a request to the image data management apparatus for the selected piece of data.

Printing information may be attached to the image data marked with the designating mark and provided with the designating information, and the image forming apparatus prints the image data with the printing information attached thereto under printing conditions shown by the printing information.

A third aspect of the present invention provides an image data management apparatus which comprises a data storage section and a connecting section to an image forming apparatus, and the image data management apparatus further comprises: a marking section for, when image data which are expected to be printed at the image forming apparatus connected via the connecting section are stored in the data storage section, marking the image data with a designating mark; and a user ID attaching section for attaching a user ID to the image data marked with the designating mark, the user ID being an ID of a user who is to print the image data at the image forming apparatus.

The image data management apparatus may further comprise: a user ID receiving section for receiving a user ID from the image forming apparatus; a searching section for searching for image data marked with the designating mark and provided with the user ID received by the user ID receiving section; and a search result sending section for sending a result of the search made by the searching section to the image forming apparatus.

The image data management apparatus may further comprise a selection receiving section for receiving, from the image forming apparatus, a selection of a piece of image data from the result of the search made by the searching section; and a data sending section for sending the selected piece of data to said image forming apparatus.

In the image data management apparatus, printing information on conditions of printing at the image forming apparatus may be attached to the image data marked with the designating mark.

A fourth aspect of the present invention provides an image forming apparatus which comprises an image forming section and which is connected to the image data management apparatus according to the third aspect of the present invention. The image forming apparatus comprises: a user authentication section for receiving a result of user authentication which is performed based on a user ID inputted by a user to judge whether to permit the user to log in; a user ID sending section for sending the user ID to the image data management apparatus; a search result receiving section for receiving the result of the search from said image data management apparatus; and a notifying section for, when there are image data marked with the designating mark and provided with the user ID in said image data management apparatus, notifying the user of the existence of the image data.

The image forming apparatus may further comprise: a display section; an operation section for receiving inputs from a user; and a data list displaying section for, when the operation section receives an input from the user in response to the notification made by the notifying section, commanding the display section to display a list showing the result of the search.

The image forming apparatus may further comprise: a selecting section for selecting a piece of image data from the result of the search sent from the image data management apparatus; and a data requesting section for requesting the image data management apparatus for the selected piece of image data.

Printing information may be attached to the image data marked with the designating mark and provided with the user ID, and the image forming apparatus prints the image data with the printing information attached thereto under printing conditions shown by the printing information.

A fifth aspect of the present invention provides an image forming system which comprises an image data management apparatus according to the first aspect of the present invention and the image forming apparatus according to the second aspect of the present invention.

A sixth aspect of the present invention provides an image forming system which comprises the image data management apparatus according to the third aspect of the present invention and the image forming apparatus according to the fourth aspect of the present invention.

In the image data management apparatus according to the present invention, data which are expected to be printed at an externally connected image forming apparatus are marked with a designating mark, and thereby, the load on the image data management apparatus for a search for a piece of data becomes lighter.

BRIEF DESCRIPTION OF THE DRAWINGS

This and other objects and features of the present invention will be apparent from the following description with reference to the accompanying drawings, in which:

FIGS. 5a, 5b and 5c are tables showing exemplary registration information;

FIG. 6 is a table showing exemplary user data;

FIG. 7 is an illustration showing exemplary attribute information of a file;

FIG. 8 is an exemplary screen displayed on a display section when a file is stored in a box of the MFP;

FIG. 13 is an illustration of an exemplary screen to show a list of pull-print files;

DETAILED DESCRIPTION OF THE PREFERRED EMBODIMENTS

First Embodiment

A first embodiment of the present invention is hereinafter described. In the first embodiment, an MFP (multi-function peripheral) is used as an image data management apparatus. An MFP is an image forming apparatus which incorporates a network printer, a scanner, a facsimile, a document server, etc.

(1) Structure of MFP 100

Figure 1:
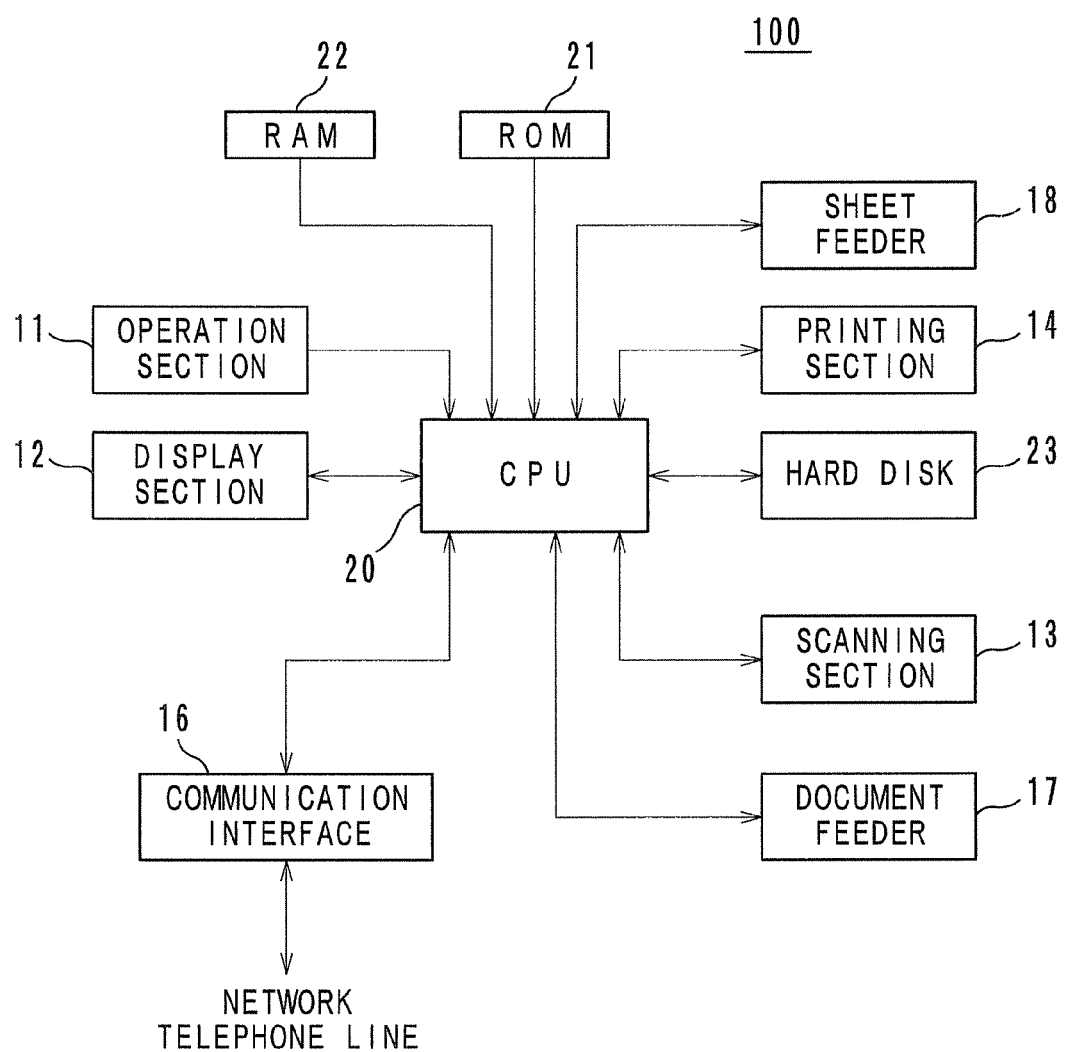
FIG. 1 is a block diagram showing a hardware structure of an MFP.

The structure of an MFP 100 is described. FIG. 1 shows an exemplary hardware structure of the MFP 100.

The MFP 100 comprises an operation section 11, a display section 12, a scanning section 13, a printing section 14, a communication interface 16, a document feeder 17, a sheet feeder 18, a CPU 20, a ROM 21, a RAM 22, a hard disk 23, etc.

The operation section 11 comprises a plural number of keys for inputs of numbers, letters and symbols, a sensor for detecting a key pressed and a circuit for sending a signal showing the pressed key to the CPU 20.

The display section 12 displays screens for presenting information to a user, screens for promoting a user to input for settings and processing, screens for showing the results of processing performed by the MFP 100, etc. In this embodiment, the display section 12 comprises a touch panel, and the touch panel also belongs to the operation section 11. The touch panel detects what area on the touch panel the user touched and sends a signal showing the result of the detection to the CPU 20.

The scanning section 13 irradiates a document and reads the reflected light, and thereby, the scanning section 13 reads an image drawn on the document. Then, the scanning section 13 generates digital image data (here, density data in RGB or in black).

The image data are used for printing at the printing section 14. Also, the image data are transformed into various formats, such as TIFF, PDF, JPEG, etc., and are stored in the hard disk 23. The image data may be transformed into facsimile data and sent by facsimile. The document feeder 17 is located, for example, on the top of the body of the MFP 100 and is used for feeding one or more documents sequentially to the scanning section 13.

The printing section 14 prints out data onto recording sheets of, for example, paper or film. The printed data are data read by the scanning section 13, data sent from an exterior device (e.g. another MFP) via a network (e.g. a LAN) or facsimile data received by facsimile.

The sheet feeder 18 is located, for example, in a lower section of the body of the MFP 100 and feeds recording sheets to the printing section 14. Printed sheets, that is, recording sheets which obtained images thereon at the printing section 14, are ejected on a sheet tray (not shown).

The communication interface 16 is an interface for communications with exterior devices, such as a printer 110 (see FIG. 14), other MFPs, personal computers, etc., via networks such as a LAN, a WAN, etc. and for sending/receiving facsimiles via a telephone line. As the communication interface 16, for example, a NIC (network interface card), a TA (terminal adapter), etc. can be used. The communication interface 16 in this embodiment functions as a connector to other MFPs, other printers, etc.

The ROM 21 is stored with programs and data for carrying out the fundamental functions of the MFP 100, such as a function as a scanner, a function as a copying machine, a function as a facsimile, a function as a network printer, a function as a document server (box function), etc. Further, the ROM 21 is stored with a program and data for a function according to the present invention as described below.

All or part of the programs and the data may be stored in the hard disk 23. In this case, the programs and the data stored in the hard disk 23 are loaded to the RAM 22 when necessary.

The function according to this embodiment is not necessarily carried out by the CPU 20 and may be carried out by using a hardware for exclusive use or by partly using a function of a general-purpose program such as an operating system (OS).

Figure 2:
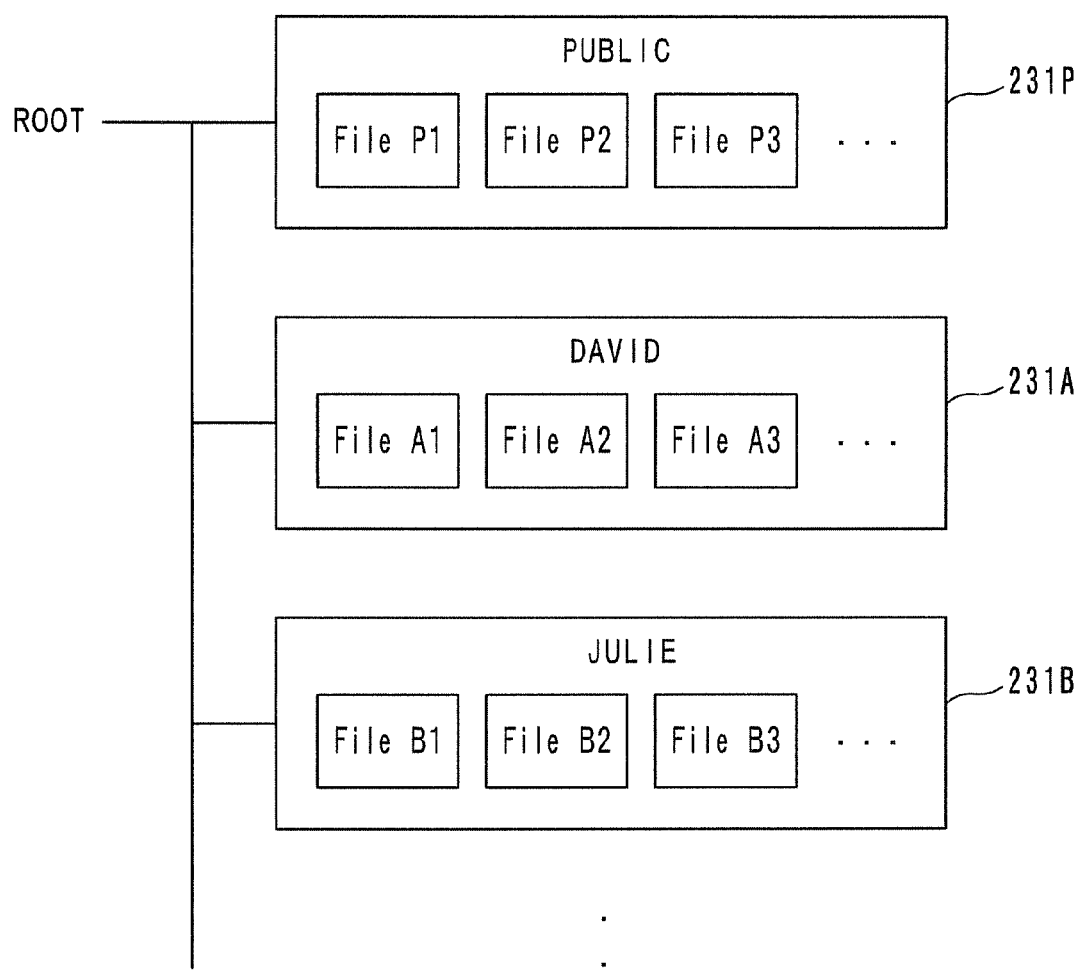
FIG. 2 is an illustration showing boxes.

In the hard disk 23, boxes for storing files therein are made. The boxes correspond to folders. FIG. 2 is an illustration showing the boxes.

In this embodiment, in the hard disk 23, private boxes 231A, 231B 231C . . . are made for individual users. Each of the private boxes is provided with a box name, which is the ID of the user who uses the private box. For example, the name of the box 231A is "David". A public box 231P, to which all the users are accessible, is made as well as the private boxes.

(2) Structure of a Virtual Sub-Network

Figure 3:
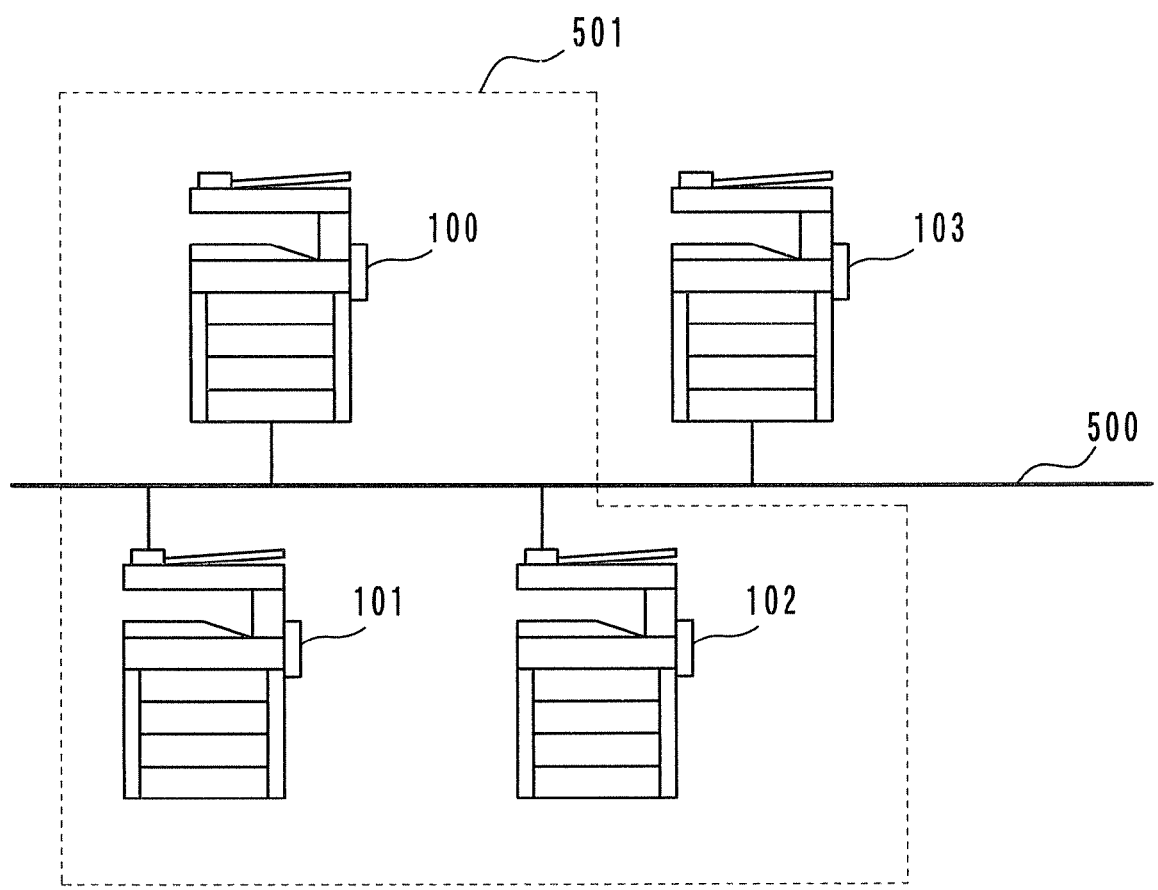
FIG. 3 is schematic view of a virtual sub-network according to a second embodiment of the present invention.

FIG. 3 is an illustration showing a virtual sub-network 501 according to this embodiment. In FIG. 3, MFPs 100, 101, 102 and 103 are connected to a network 500.

In this embodiment, the MFP 100, the MFP 101 and the MFP 102 has a same group name, and these three MFPs form a virual sub-network 501. The MFP 103 has another group name and is not a member of the virtual sub-network 501. MFPs exchange their group names with one another, for example, by a broadcast packet, and then, MFPs with a same group name form a virtual sub-network.

In the virtual sub-network 501 according to this embodiment, each of the MFPs 100, 101 and 102 has main users. Accordingly, each of the MFPs 100, 101 and 102 has registration information on their main users. The registration information on each user, which will be describer later, includes at least a user ID.

In this embodiment, an MFP which is stored with registration information on a user is called the user's "home MFP". For example, when registration information on a user "David" is stored in the MFP 100, David's home MFP is the MFP 100. The purpose of storing such registration information in the MFPs 100, 101 and 102 is to improve the operability of the MFPs 100, 101 and 102 by registering main users in the individual MFPs 100, 101 and 102 beforehand and is not to prohibit other users from operating the MFPs 100, 101 and 102.

Now, suppose that the MFPs 101 and 102 are connected to the network 500 and belong to the virtual sub-network 501 and that the MFP 100 is to be newly connected to the network 500. The MFP 100 must have a device ID and registration information on its main users. When a device ID and registration information are stored in the MFP 100, the device ID and the registration information are sent to the other MFPs 101 and 102.

Figure 4:
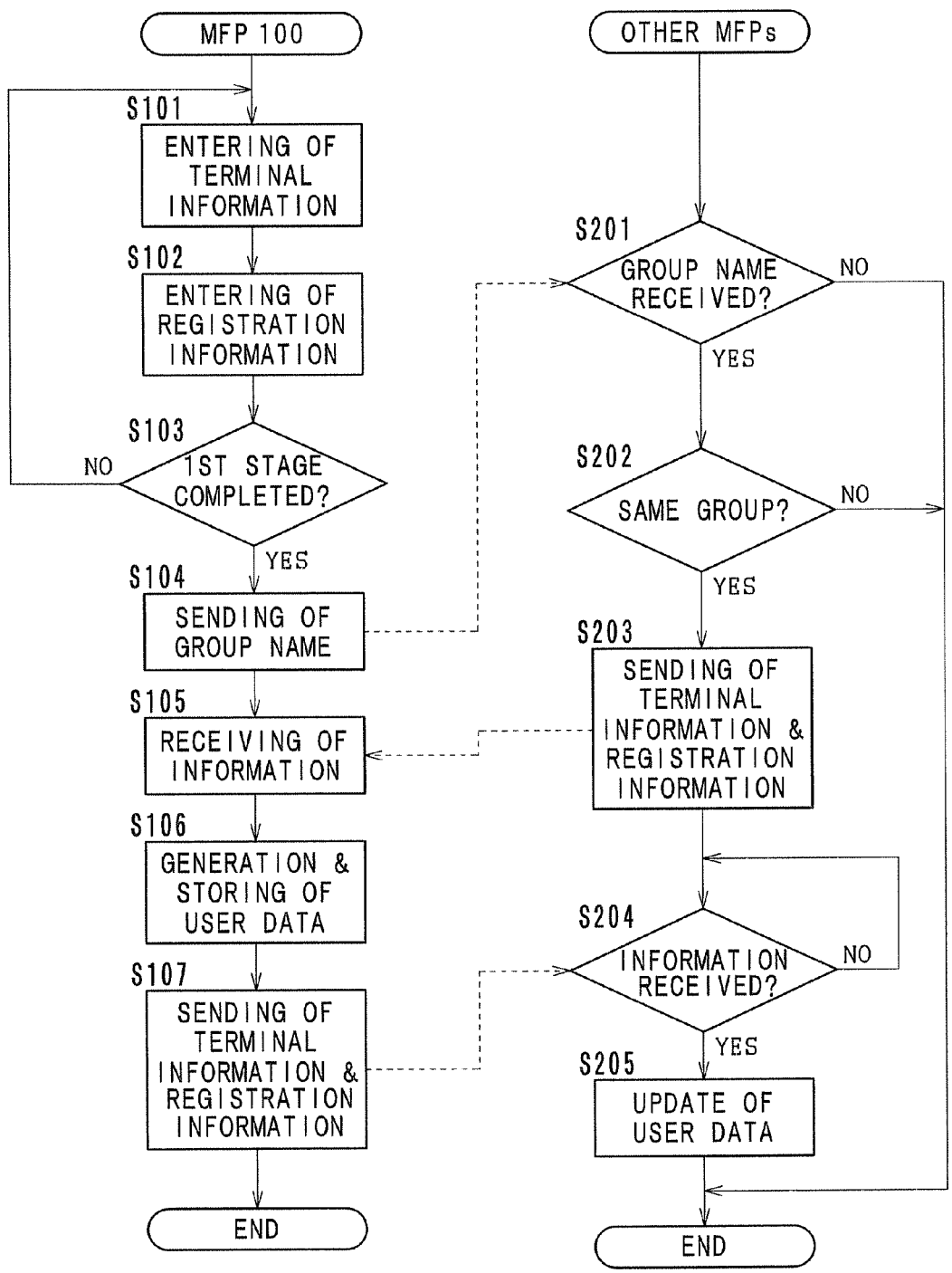
FIG. 4 is a flowchart showing a procedure carried out by an MFP which is to be newly connected to the virtual sub-network and a procedure carried out by the other MFPs in the virtual sub-network.

Next, a specific procedure for forming a virtual sub-network 501 is described. FIG. 4 is a flowchart showing a procedure carried out by the MFP 100 to be newly connected to the network 500 and a procedure carried out by the other MFPs.

Before forming a virtual sub-network 501, terminal information is entered in the MFP 100 (step S101). The terminal information includes a device ID for identifying the MFP 100 and a group name. The device ID is preferably information showing the position of the MFP 100 in the network 500, and for example, an IP address can be used as the device ID.

Next, registration information on a user which will use the MFP 100 as his/her home MFP is entered in the MFP 100 (step S102). When a plural number of users wish to use the MFP 100 as their home MFP, registration information on the individual users are entered.

The registration information on each user includes a user ID, which is a code peculiar to the user. In this embodiment, a user's name is the user's ID. The registration information on each user includes private information on the user.

The private information is, for example, information on privacy, an address note, information on panel settings, authentication information and history information. The private information is used to improve the operability of MFPs in a virtual sub-network. Specifically, when a user logs in the virtual sub-network 501 from an MFP other than his/her home MFP, the private information permits the user to operate the MFP in the same way as operating his/her home MFP.

The terminal information and the registration information are inputted by users' operations at the operation section 11. Specifically, a terminal information input screen and a registration information input screen are displayed on the display section 12, and users input necessary information by operating the operation section 11 following instructions displayed on the screens.

Thereafter, it is judged whether the first stage of entering terminal information and registration information in the MFP 100 has been completed (step S103). When the first stage has not been completed, the processing returns to step S101. On completion of the first stage (YES at step S103), the MFP 100 sends its group name to the other MFPs (step S104) by broadcasting.

Each of the other MFPs connected to the network 500 (MFP 101, etc.) receives the group name from the MFP 100 (YES at step S201) and judges whether the group name received is identical with a group name stored therein (step S202). When the group name sent from the MFP 100 is identical with the group name stored in the MFP (YES at step S202), the MFP sends terminal information and registration information stored therein to the MFP 100 (step S203). At this time, because the MFP 103 has another group name, the MFP 103 does not send terminal information stored therein to the MFP 100. In this way, a virtual sub-network 501 is formed among MFPs which have the same group name.

The MFP 100 receives terminal information and registration information from the MFPs in the same group (MFPs 101 and 102) (step S105) and generates user data (step S106). Then, the MFP 100 sends the terminal information and the registration information which were entered at the first stage to the MFPs 101 and 102 (step S107). After receiving the terminal information and the registration information from the MFP 100 (YES at step S204), the MFPs 101 and 102 update user data stored therein individually (step S205).

FIGS. 5a to 5c are illustrations showing the registration information. FIG. 5a shows exemplary registration information inputted into the MFP 100. FIG. 5b shows exemplary registration information inputted into the MFP 101. FIG. 5c shows exemplary registration information inputted into the MFP 102.

In this embodiment, the registration information on each user includes a number, the user ID and private information. The private information includes information on privacy, an address note, information on panel settings, authentication information and history information. The information on privacy includes, for example, information on the department the user belongs to, the e-mail address of the user, the user's face data obtained by taking a photo of the user, etc.

An address note contains information on persons the user is communicable with and for example, contains user IDs, e-mail addresses, facsimile numbers, etc. of the persons.

Information on panel settings is information on screens customized by the user. Authentication information is information used for authentication of the user when the user logs in the virtual sub-network 501, and in this embodiment, a password is used as the authentication information.

History information is data generated in the MFPs 100, 101 and 102 when the user makes commands to the MFPs 100, 101 and 102, and the history information includes the contents of the commands. For example, when a user makes a command for e-mail sending, history information showing that the command is for e-mail sending, showing the receiver of the e-mail and showing the content of the e-mail is generated.

The user data generated in the MFP 100 and in each of the other MFPs are the total data of the terminal information and the registration information stored in the MFPs 100, 101 and 102, and the user data include numbers, user IDs and the device IDs identifying the individual user's home MFPs.

FIG. 6 is a table showing exemplary user data. In each of the MFPs, the user data are stored in the hard disk. As described above, the MFP 100, 101 and 102 have the same user data.

Thus, the MFPs 100, 101 and 102 with the same group name generate and store the same user data. Thereby, the MFPs 100, 101 and 102 form a virtual sub-network 501. Once the virtual sub-network 501 is formed, any of the MFPs can recognize a user's home MFP based on the user data. Therefore, even when a user logs in the virtual sub-network 501 from an MFP other than his/her home MFP, the user's home MFP can detect the user's log-in.

In this embodiment, the user data includes individual users' private information. However, even when a user logs in a device other than his/her home MFP, the device can recognize the user's home MFP with reference to the user data and can receive the user's private information from his/her home MFP. Therefore, the private information on individual users does not have to be included in the user data.

(3) Pull-Printing

Each of the boxes can be stored with files of image data, etc. In this embodiment, a file can be provided with a mark (a pull-print mark). The mark is to show that the marked file is expected to be submitted to pull-printing, wherein data in the marked file are transferred to another MFP and printed by the MFP. FIG. 7 shows exemplary attribute information of a file.

In this embodiment, the attribute information of a file includes the file name, the storage section stored with the file, marking/non-marking of pull-printing, the pull-print user ID, setting/non-setting of simple authentication for pull-printing and the simple authentication code. FIG. 8 shows an exemplary screen displayed on the display section 12 when a file is stored in a box of the MFP 100.

When "Pull-Printing: YES" is entered on the screen of FIG. 8, the file is provided with the pull-print mark. Pull-printing means to transfer data to an externally connected printer which made a request and to print the data in the printer. By marking files to be possibly submitted to pull-printing, the printer can search for a file only within the marked files. Thus, the pull-print mark lightens the load on the printer for search for a file.

When a pull-print user ID as well as the pull-print mark is provided, by inputting a user ID at a printer in searching for a file, the search is made within files stored by the user and provided with the pull-print mark. As FIG. 7 shows, the pull-print user ID is provided for a file as attribute information of the file. Therefore, a search is not limited within David's private box 231A, and other boxes (for example, the public box 231P) may be also searched. A plural number of user IDs may be set as the pull-print users of the file. When such a file provided with a plural number of user IDs as the pull-print users is not stored in the public box and stored in the private box of one of the pull-print users, an arrangement to permit the other users to make an access to the private box may be necessary.

Figure 14:
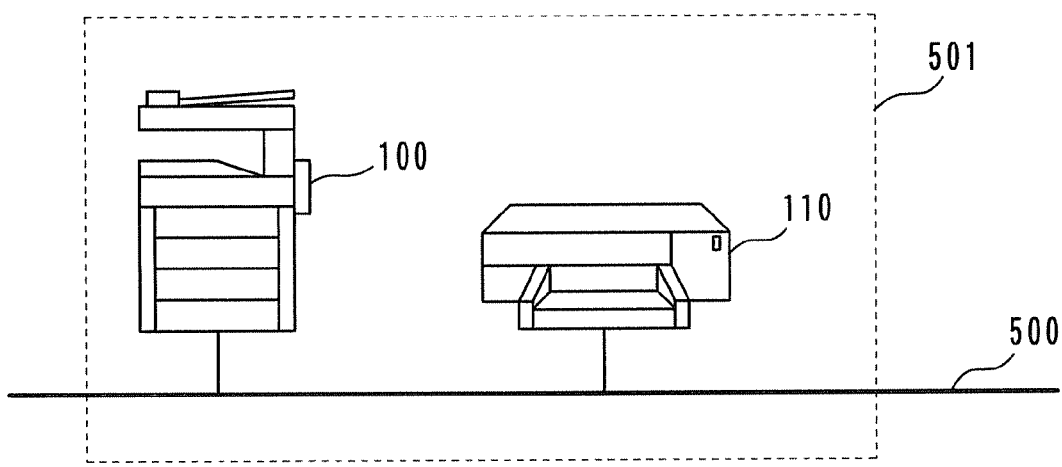
FIG. 14 is a schematic view of an image forming system according to a second embodiment of the present invention.

The simple authentication included in the attribute information of a file shown by FIG. 8 is a setting to show whether pull-printing is to be carried out even at a simple printer which cannot make authentication and which has only a few buttons in a small display section (for example, a printer 110 shown by FIG. 14 described in the second embodiment). When "Simple Authentication: YES" is entered on the screen of FIG. 8, further a simple authentication code must be inputted. When a user wishes to perform pull-printing at a simple printer such as the printer 110, the user must present the simple authentication code. The simple authentication code may be composed of only digits or may include letters and marks as well as digits (as long as they can be inputted at the printer 110). The user makes inputs as described above and presses an "ENTER" button 121. Then, the file is stored in the designated box.

It is possible to store files provided with the pull-print mark in the hard disks of the individual MFPs shown in FIG. 3. The MFP stored with files provided with the pull-print mark is an embodiment of an image data management apparatus according to the present invention. Further, when another MFP receives the file provided with the pull-print mark and prints out the file, the MFP is an embodiment of an image forming apparatus according to the present invention.

(4) Procedure at the Time of a User's Log-in

In the following, a procedure when a user's log-in is detected is described. In this embodiment, when any of the MFPs in the virtual sub-network 501 detects a user logging in, the screen displayed on the display 12 depends on whether the user's home MFP stores files provided with the pull-print mark.

Figure 9:
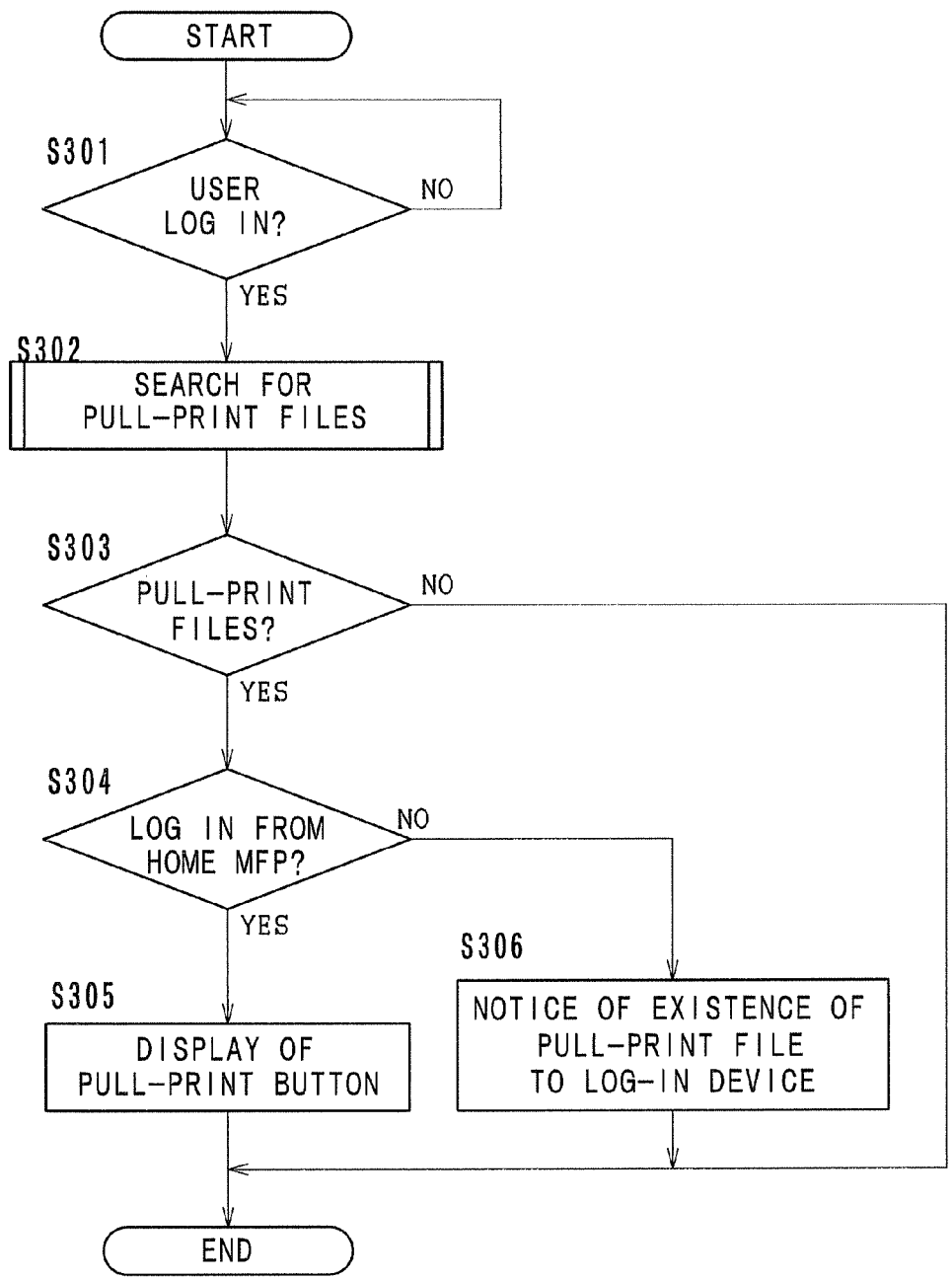
FIG. 9 is a flowchart showing a procedure carried out, when a user's log-in is detected, by the user's home MFP.

FIG. 9 is a flowchart showing an exemplary procedure when a user's log is detected in this embodiment. When a user's log-in is detected (YES at step S301), a search for files provided with the pull-print mark (hereinafter referred to as pull-print files) is made (step S302).

Figure 10:
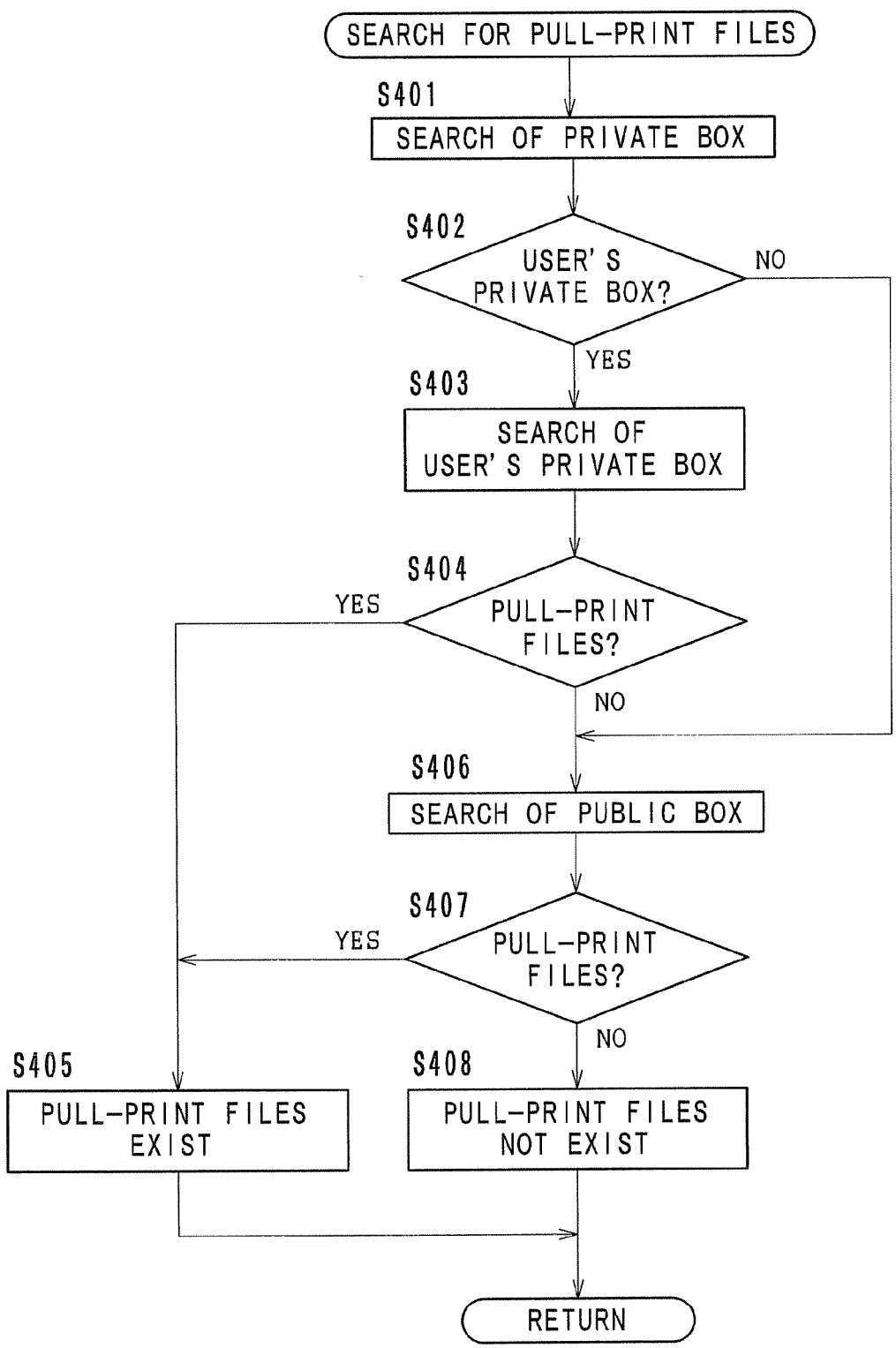
FIG. 10 is a flowchart showing a procedure for searching a pull-print file.

FIG. 10 is a flowchart showing an exemplary procedure for the search for pull-print files. In the procedure for the search for pull-print files, first, it is judged whether the user's home MFP has a private box for the user (step S401). When the user's home MFP does not have a private box for the user (NO at step S402), the processing goes to step S406.

When the user's home MFP has a private box for the user (YES at step S402), the private box is searched for pull-print files (step S403). When a pull-print file is in the private box (YES at step S404), it is judged that there is a pull-print file (step S405).

If the user's home MFP does not have a private box for the user (NO at step S402) or if there are no pull-print files in a private box for the user (NO at step S404), then, the public box is searched for pull-print files (step S406).

When a pull-print file is in the public box (YES at step S407), it is judged that there is a pull-print file (step S405).

When there are no pull-print files in the public box (NO at step S407), it is judged that there are no pull-print files (step S408).

In this embodiment, the user's home MFP is searched for pull-print files. However, the other MFPs as well as the user's home MFP may be searched for pull-print files.

Referring back to FIG. 9, when there is a pull-print file (YES at step S303), it is judged whether the user logs in from his/her home MFP (step S304). When the user logs in from his/her home MFP (YES at step S304), a pull-print button is displayed on the display section 12 of the user's home MFP (step S305).

Figure 11:
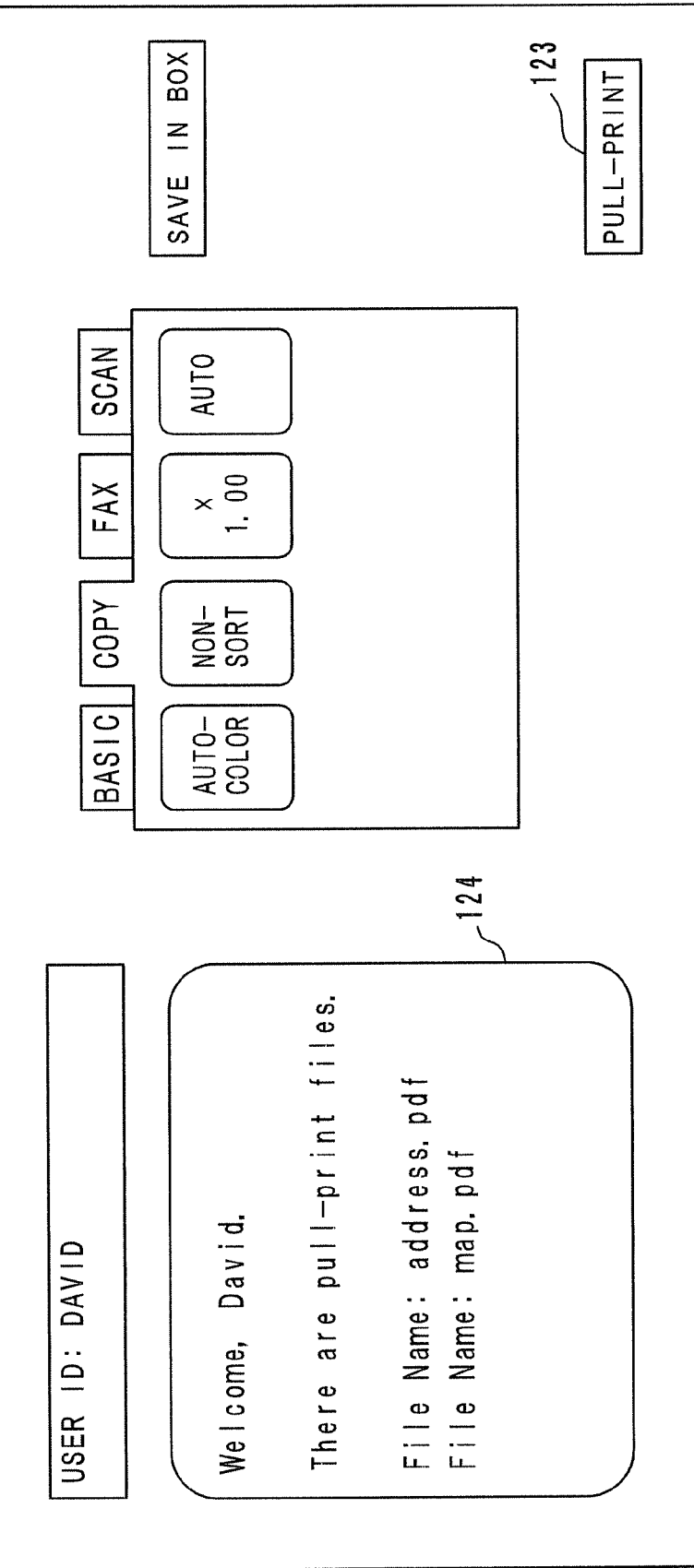
FIG. 11 is an illustration of an exemplary screen for pull-printing displayed on the display section.

FIG. 11 is an illustration showing the pull-print button and shows an exemplary screen displayed on the display section 12. As shown by FIG. 11, when there is a pull-print file, a pull-print button 123 is displayed on the display section 12. As will be described later, when the pull-print button 123 is pressed, for example, a list of pull-print files is displayed.

The way of notifying the user of the existence of a pull-print file is not limited to a display of the pull-print button 123. The notification may be a display of a pull-print file name in the section 124 (see FIG. 11) or may be an audio output.

Referring back to FIG. 9, when the user logs in from a device other than his/her home MFP (NO at step S304), the home MFP sends a notice of the existence of a pull-print file to the logging-in device (step S306). The logging-in device, after receiving the notice, notifies the user of the existence of a pull-print file by displaying the pull-print button 123 as shown by FIG. 11 or by other ways.

Figure 12:
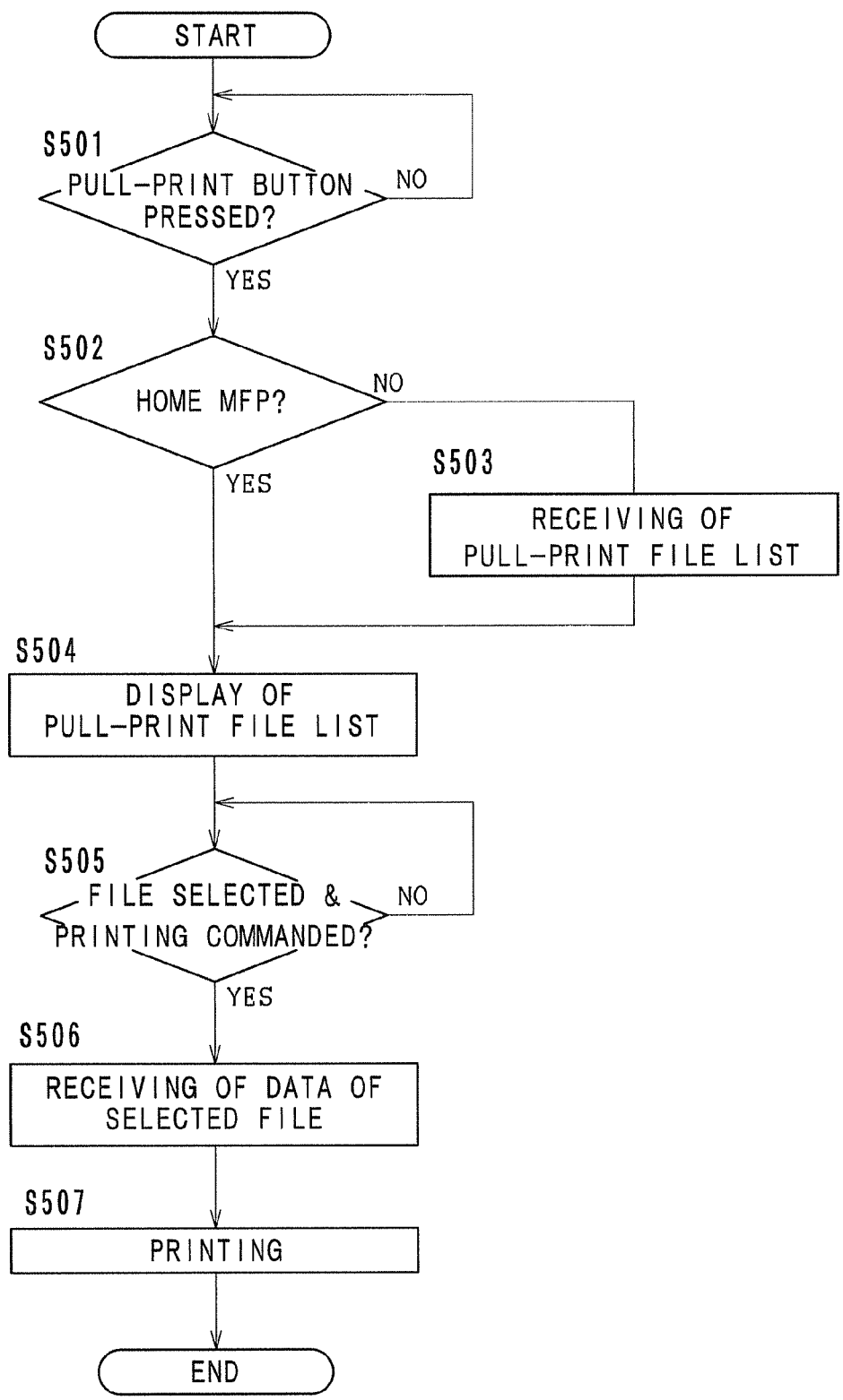
FIG. 12 is a flowchart showing a procedure carried out after a pull-print button is pressed.

FIG. 12 is a flowchart showing an exemplary procedure when the pull-print button 123 is pressed. When the pull-print button is pressed (YES at step S501), it is judged whether the pressing of the button is made at the user's home MFP (step S502).

When the pressing is made at a device other than the user's home MFP (NO at step S502), the device receives a list of pull-print files from the user's home MFP (step S503). FIG. 13 shows an exemplary screen to show a list of pull-print files. On the screen, when a "PRINT" button 125 is pressed after either one of the files is selected (YES at step S505), the device reads out data of the selected file (step S506) and prints the data (step S507). When the selected file is not in the device, the device receives data of the file from another MFP and prints the data.

Second Embodiment

A second embodiment of the present invention is hereinafter described. In the second embodiment, pull-printing is performed by use of a simple printer with a poor user interface such as the printer 110. FIG. 14 is an illustration showing an exemplary structure of an image forming system according to the second embodiment. The image forming system according to the second embodiment comprises an MFP 100 and a printer 110 connected to each other via a network 500 such as a LAN.

A virtual sub-network 501 is formed between the MFP 100 and the printer 110. The virtual sub-network 500 can be formed in the same way as described in connection with the first embodiment. A simple printer like the printer 110 may not be able to store registration information therein although having a group name. However, as long as the printer 110 has a group name, it can be judged from the group name whether the printer 110 is a member of the virtual sub-network 501.

As described above, the MFP 100 has a hard disk 23 as a data storage section, and in the second embodiment, data with a designated simple authentication code are read out from the hard disk 23 and printed by the printer 110. The printer 110 in the second embodiment cannot perform user authentication and has a simple display section which can display only a short message, for example, in two lines.

Figure 15A:
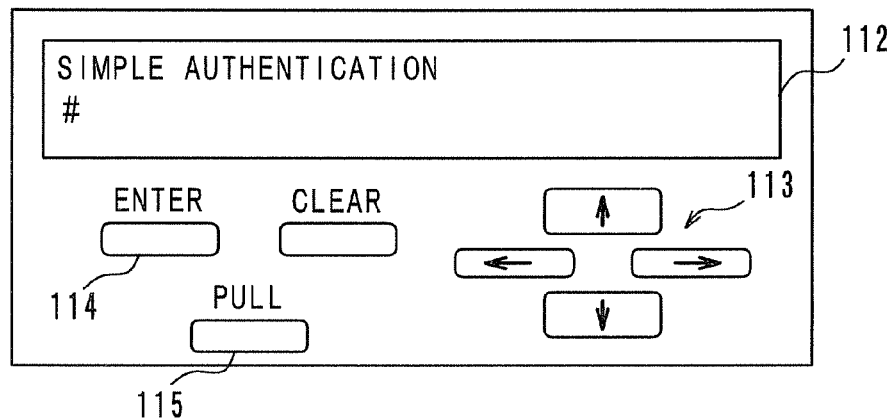
FIGS. 15a, 15b and 15c are illustrations showing an exemplary way of displaying a message on a display section of a printer according to the second embodiment.
Figure 15B:
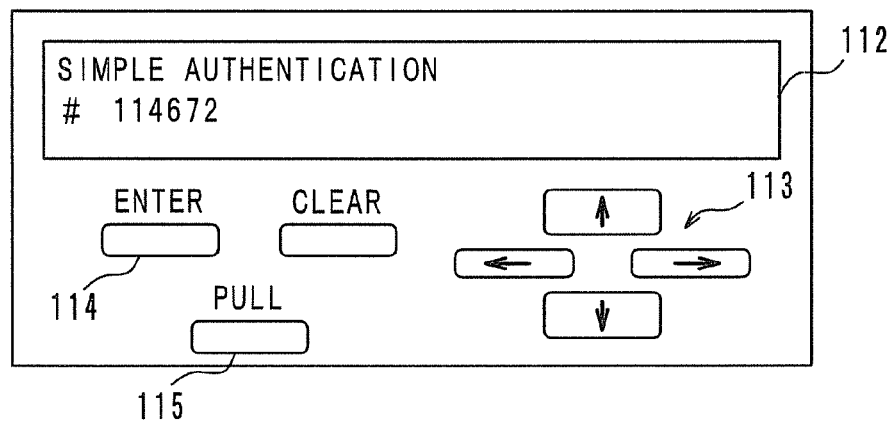
Figure 15C:
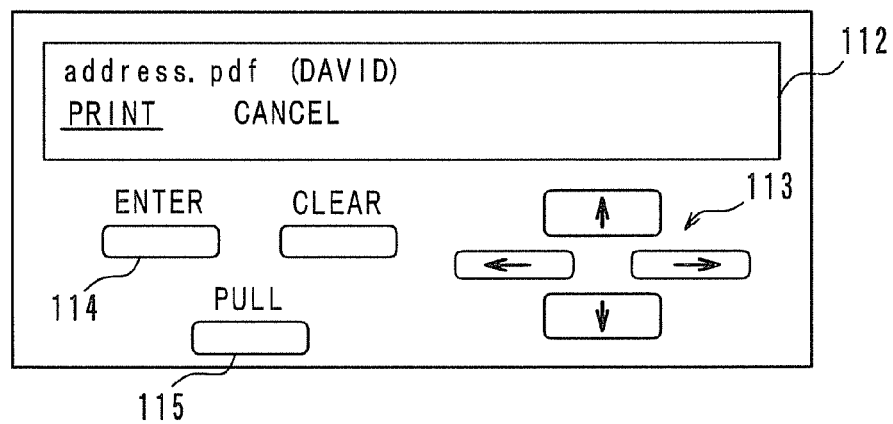

FIGS. 15a, 15b and 15c show exemplary messages displayed in a display section 112 of the printer 110. When a user commands pull-printing at the user interface of the printer 110, as shown by FIG. 15a, the user is requested to input a simple authentication code, which is information to designate a file to be pull-printed. In this embodiment, the printer 110 has a pull-print button 115, but pull-printing may be commanded by use of arrow keys 113 and an enter key 114.

As shown by FIG. 15b, the user inputs a simple authentication code by use of the arrow keys 113 and the enter key 114. After a simple authentication code is inputted, a file name of the file designated by the simple authentication code is displayed as shown by FIG. 15c. Then, the enter key 114 is pressed while the word "Print" is underlined, and thereby, pull-printing is performed. Thus, simple authentication codes permit a printer which cannot search boxes in the MFP to perform pull-printing.

Figure 16:
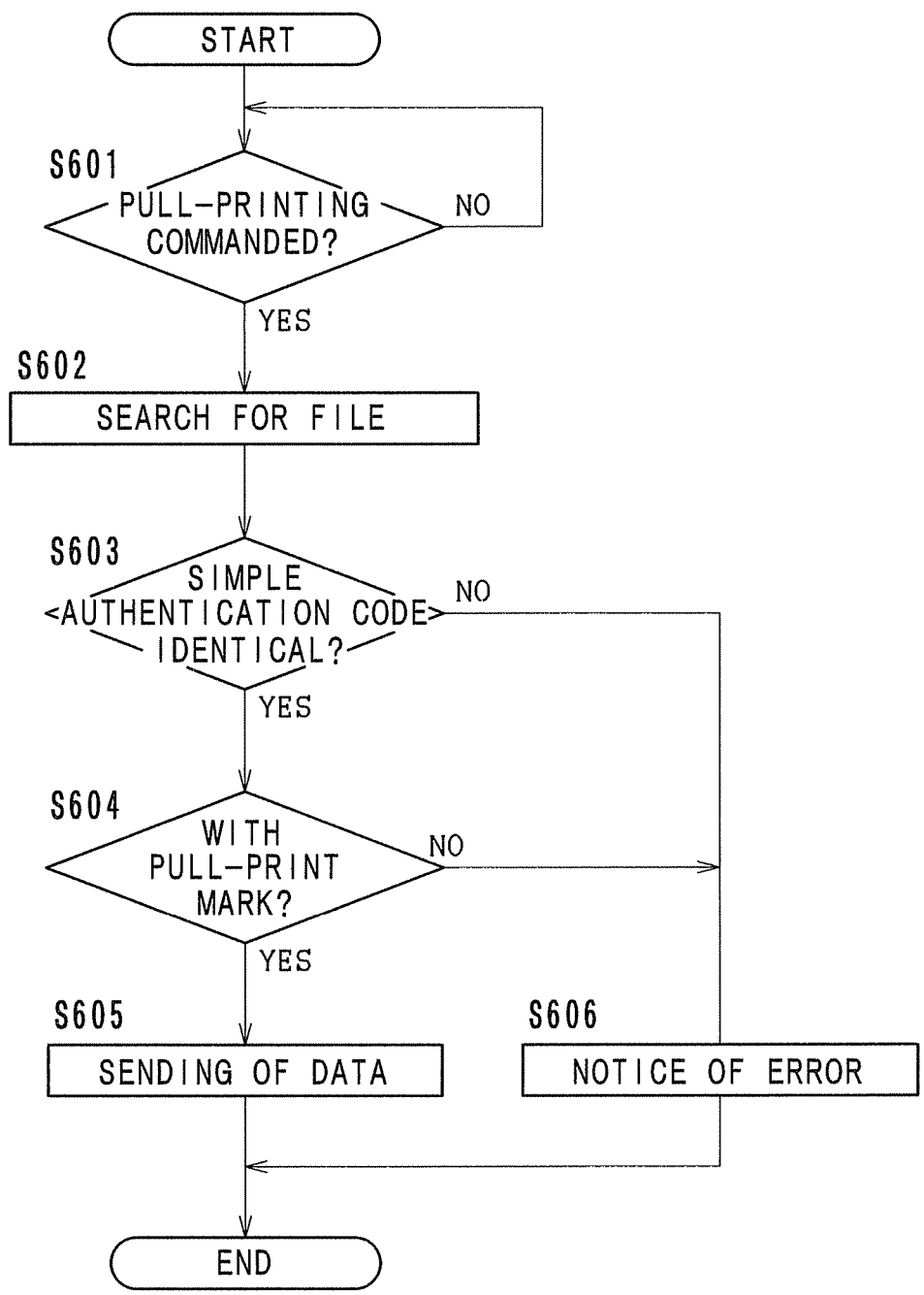
FIG. 16 is a flowchart showing an exemplary procedure carried out by the MFP when pull-printing is commanded at the printer.

FIG. 16 is a flowchart showing an exemplary procedure carried out by the MFP 100 when a user commands pull-printing at the printer 110. When the MFP 100 receives a pull-print command from the printer 110, which is a member of the virtual sub-network the MFP 100 belongs to (YES at step S601), the MFP 100 searches for a file provided with the simple authentication code sent from the printer 110 (step S602).

When there is a file provided with the simple authentication code (YES at step S603), it is judged whether the file is provided with the pull-print mark (step S604). When the file is provided with the pull-print mark (YES at step S604), the MFP 100 sends data of the file to the printer 110 (step S605). Then, the printer 110 receives the data from the MFP 100 and prints out the data, and thus, pull-printing is completed. If there is no file provided with the designated simple authentication code (NO at step S603), or if the file provided with the designated simple authentication code is not provided with the pull-print mark (NO at step S604), the MFP 100 sends a notice of error to the printer 110 (step S606).

In the second embodiment, the printer 110 may not be structured to request the user to input a simple authentication code immediately after receiving a pull-print command (for example, a press-down of the pull-print button 115). When pull-printing is commanded at the printer 110, the MFP 100 may search for files provided with the pull-print mark and simple authentication codes and may send the search results to the printer 110, and the printer 110 may display the search results.

The printer 110 receives the search results (a list of simple authentication codes of files provided with the pull-print mark) and displays the simple authentication codes on the display section 112. When the printer 110 receives a plural number of authentication codes, the user can see the simple authentication codes sequentially by commanding a scroll by use of the arrow keys 113. Then, when the user presses the enter key 114 while a desired simple authentication code is displayed, the printer 110 receives data of the file designated by the simple authentication code from the MFP 100 and prints out the data.

When there are files provided with the pull-print mark in the MFP 100, the printer 110 may display the simple authentication codes of the files on the display section 112 immediately. Also, the printer 110 may notify the user of the existence of files provided with the pull-print mark (the notification may be a visual notice on the display section 112 or may be an audio notice), and thereafter the printer 110 may display the simple authentication codes.

A plural number of image data management apparatuses (MFPs) with data storage sections (for example, hard disks) may be connected to the virtual sub-network 501. In this case, the printer 110 may promote a user to select one from the image data management apparatuses in the virtual sub-network 501 or may display simple authentication codes of all files provided with the pull-print mark stored in all the image data management apparatuses in the virtual sub-network 501.

Modifications

As well as the embodiments above, the following modifications are possible.
Modification 1

When a user inputs his/her ID for user authentication and is permitted to store a pull-print file in a box in the MFP 100, it is preferred in view of security that information for simple authentication of the file includes the user ID. Further, attribute information, such as information on printing conditions (sheet size, color/monochromatic, number of copy sets, availability of two-in-one printing, etc.) may be attached to the file. In this case, it is not necessary to input printing settings at the printer 110, which improves the operability of the printer 110.
Modification 2

In both the first embodiment and the second embodiment, after completion of pull-printing of a file or when pull-printing of a file becomes no longer necessary, the pull-print mark may be deleted from the file, and a file already printed out may be deleted from the box. A file provided with the pull-print mark can be pull-printed again and again until the pull-print mark is deleted from the file. A file provided with the pull-print mark can be printed at a plural number of printers by different users, as long as the file has a simple authentication code and the users know the simple authentication code.
Modification 3

When there is only one file which can be pull-printed, a display of a list of pull-print files (first embodiment) or a display of a list of simple authentication codes (second embodiment) may be omitted, and the user may be able to press the pull-print button 123 (first embodiment) or 125 (second embodiment) immediately. In the first embodiment, when there is only one file which can be pull-printed, for example, a message, "Press PULL button 123, then pull-printing will start." may be displayed in the section 124 shown in FIG. 11.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An image forming apparatus connected to an image data management apparatus, said image forming apparatus and said image data management apparatus forming a virtual sub-network,
said image data management apparatus comprising:
a data storage section;
a connecting section to said image forming apparatus; and
a marking section for, when image data which are expected to be printed at said image forming apparatus connected via the connecting section are stored in the data storage section, marking the image data stored in the data storage section with a pull-print mark, by means of which the image data are distinguished from other image data stored in the data storage section; and
said image forming apparatus comprising;
a searching section for searching the data storage section for image data marked with the pull-print mark;
a notifying section for, when there are image data marked with the pull-print mark in said image data management apparatus, notifying the user of the existence of the image data;
a display section;
an operation section for receiving inputs from a user; and
a designated data display section for, when the operation section receives an input from a user in response to the notification made by the notifying section, commanding the display section to display the result of the search.

2. An image forming apparatus according to claim 1, further comprising:
a selecting section for selecting a piece of data to be printed from the result of the search; and
a data requesting section for making a request to said image data management apparatus for the selected piece of data.

3. An image forming apparatus according to claim 1, wherein when printing information is attached to the image data marked with the pull-print mark, the image data are printed under printing conditions shown by the printing information.

4. An image forming apparatus comprising an image forming section and connected to an image data management apparatus,
said image data management apparatus comprising:
a data storage section;
a connecting section to said image forming apparatus;
a marking section for, when image data which are expected to be printed at said image forming apparatus connected via the connecting section are stored in the data storage section, marking the image data stored in the data storage section with a designating mark;
a user ID attaching section for attaching a user ID to the image data marked with the designating mark, the user ID being an ID of a user who is to print the image data at said image forming apparatus; and
a user ID receiving section for receiving a user ID from said image forming apparatus; and
said image forming apparatus comprising:
a user authentication section for receiving a result of user authentication which is performed based on a user ID inputted by a user to judge whether to permit the user to log in;
a user ID sending section for sending the user ID to said image data management apparatus;
a searching section for searching for image data marked with the designating mark and provided with the user ID received by the user ID receiving section;
a notifying section for, when there are image data marked with the designating mark and provided with the user ID in said image data management apparatus, notifying the user of the existence of the image data;
a display section;
an operation section for receiving inputs from a user; and
a data list displaying section for, when the operation section receives an input from the user in response to the notification made by the notifying section, commanding the display section to display a list showing the result of the search.

5. An image forming apparatus according to claim 4, further comprising:
a selecting section for selecting a piece of image data from the result of the search sent from the image data management apparatus; and
a data requesting section for requesting said image data management apparatus for the selected piece of image data.

6. An image forming apparatus according to claim 4, wherein when printing information is attached to the image data marked with the designating mark and provided with the user ID, the image data are printed under printing conditions shown by the printing information.

7. An image forming system comprising an image data management apparatus comprising a data storage section and a connecting section, and an image forming apparatus connected to said image data management apparatus via the connecting section, said image data management apparatus and said image forming apparatus forming a virtual sub-network,
said image data management apparatus further comprising:
a marking section for, when image data which are expected to be printed at said image forming apparatus are stored in the data storage section, marking the image data stored in the data storage section with a pull-print mark, by means of which the image data are distinguished from other image data stored in the data storage section;
a searching section for searching the data storage section for image data marked with the pull-print mark; and
a search result sending section for sending a result of the search made by the searching section to said image forming apparatus, and
said image forming apparatus comprising:
a search result receiving section for receiving the result of the search from said image data management apparatus;
a notifying section for, when there are image data marked with the pull-print mark in said image data management apparatus, notifying the user of the existence of the image data;
a display section;
an operation section for receiving inputs from a user; and
a designated data display section for, when the operation section receives an input from a user in response to the notification made by the notifying section, commanding the display section to display the result of the search.

8. An image forming system comprising an image data management apparatus comprising a data storage section and a connecting section, and an image forming apparatus comprising an image forming section and connected to said image data management apparatus via the connecting section,
said image data management apparatus further comprising:
a marking section for, when image data which are expected to be printed at said image forming apparatus are stored in the data storage section, marking the image data stored in the data storage section with a designating mark;
a user ID attaching section for attaching a user ID to the image data marked with the designating mark, the user ID being an ID of a user who is to print the image data at said image forming apparatus;
a user ID receiving section for receiving a user ID from said image forming apparatus;
a searching section for searching for image data marked with the designating mark and provided with the user ID received by the user ID receiving section; and
a search result sending section for sending a result of the search made by the searching section to said image forming apparatus, and
said image forming apparatus comprising:
a user authentication section for receiving a result of user authentication which is performed based on a user ID inputted by a user to judge whether to permit the user to log in;
a user ID sending section for sending the user ID to said image data management apparatus;
a search result receiving section for receiving the result of the search from said image data management apparatus;
a notifying section for, when there are image data marked with the designating mark and provided with the user ID in said image data management apparatus, notifying the user of the existence of the image data;
a display section;
an operation section for receiving inputs from a user; and
a data list displaying section for, when the operation section receives an input from a user in response to the notification made by the notifying section, commanding the display section to display the result of the search.

9. An image forming apparatus according to claim 1, wherein the image data management apparatus further comprises:
a designating information marking section for marking the image data with designating information in addition to the pull-print mark, a user presenting the designating information to said image data management apparatus when the user makes a request for the marked image data at said image forming apparatus without presenting the pull-print mark;
wherein said searching section searches the data storage section for image data marked with the pull-print mark and the designating information.

10. An image forming system according to claim 7, wherein said image forming apparatus further comprises:
a selecting section for selecting a piece of data to be printed from the result of the search; and
a data requesting section for making a request to said image data management apparatus for the selected piece of data.

11. An image forming system according to claim 8, wherein said image forming apparatus further comprises:
a selecting section for selecting a piece of image data from the result of the search sent from the image data management apparatus; and
a data requesting section for requesting said image data management apparatus for the selected piece of image data.

12. An image forming apparatus according to claim 1, further comprising:
a user authentication section for authenticating a user who logs in to the image forming apparatus; and
a control section for controlling to print selected image data from the result of the search;

wherein when the search result for an authenticated user is only one image data, the control section allows to print the image data without displaying the result of the search.

13. An image forming apparatus according to claim 4, further comprising:
a control section for controlling to print selected image data from the result of the search;
wherein when the search result for an authenticated user is only one image data, the control section allows to print the image data without displaying the list.

* * * * *